O. C. DAVIS.
WELT STRIP.
APPLICATION FILED NOV. 28, 1914.
1,139,403.
Patented May 11, 1915.
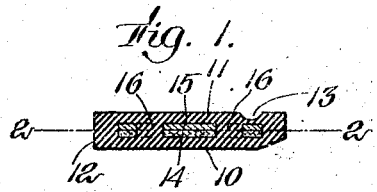
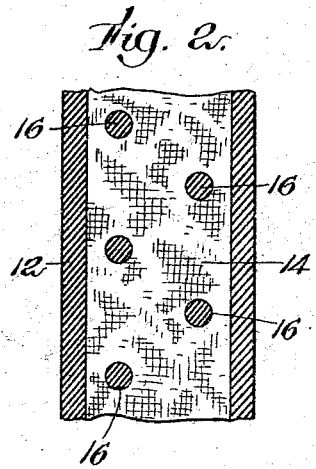
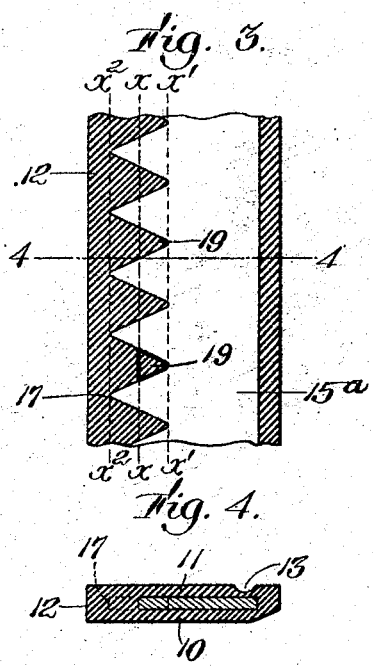
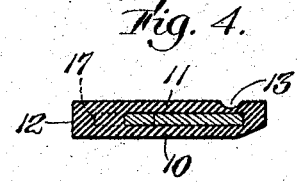
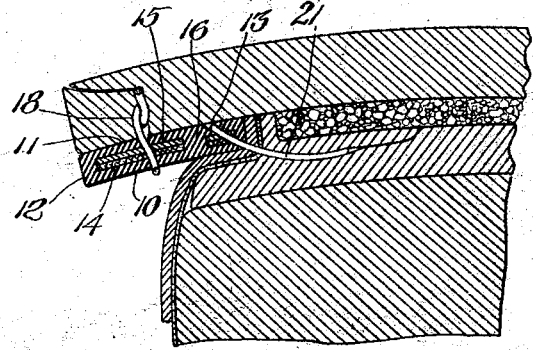
Witnesses:
W. P. Abell
E. P. Brannen
Inventor:
Oscar C. Davis,
by [signature]
Attorneys.

UNITED STATES PATENT OFFICE.

OSCAR C. DAVIS, OF BROCKTON, MASSACHUSETTS, ASSIGNOR OF ONE-HALF TO GEORGE E. KEITH, OF BROCKTON, MASSACHUSETTS.

WELT-STRIP.

1,139,403.  Specification of Letters Patent.  Patented May 11, 1915.

Application filed November 28, 1914. Serial No. 874,551.

*To all whom it may concern:*

Be it known that I, OSCAR C. DAVIS, a citizen of the United States, and resident of Brockton, in the county of Plymouth and State of Massachusetts, have invented certain new and useful Improvements in Welt-Strips, of which the following is a specification.

In my copending application, Serial No. 861,468, filed September 12, 1914, I have shown a welt strip consisting of rubber and woven fabric, the woven fabric being embedded in the rubber and serving as a reinforcing member to receive the stitches and sustain the stresses imposed upon the strip. The rubber is vulcanized to cause interlocking with the reinforcing strip. So far as sustaining the stresses is concerned, such welt strip is entirely satisfactory, but there is one disadvantage due to the fact that along the shank portions of a shoe the welt strip is trimmed more than elsewhere. The outer edge of the reinforcing strip lies sufficiently close to the outer edge of the rubber to receive the outseam stitches around the toe of the shoe, and consequently where the welt strip is trimmed more closely to the inner edge, as along the shank portions, the reinforcing strip is exposed. If such reinforcing strip be woven fabric it causes a ragged edge where it is exposed, and for this reason the appearance of the welt strip is rendered objectionable. The ragged appearance thus caused is due in part to the fact that the top and bottom layers of rubber have no direct connection with each other outside the line of stitches, being separated by the interposed layer of fabric; and as the rubber in that case is entirely dependent upon being vulcanized to the fabric to keep the layers together, the outer edges of the layers become separated, thus giving more prominence to the fabric.

In order to avoid the objectionable appearance due to the causes above specified, I have made an improvement whereby the top and bottom layers of rubber are interlocked with the interposed reinforcing strip, the latter being specially prepared with formations for that purpose, although I still vulcanize the rubber to make the union of the members more perfect. The interlocking due to my present improvement makes it practicable to use leather for reinforcing purposes; but, without such interlocking formations, leather would not afford any suitable means for holding the rubber.

Of the accompanying drawings, which illustrate various forms in which the present invention may be embodied: Figure 1 represents a cross-sectional view of a welt strip consisting of a main body of rubber and two layers of reinforcing material one of which is leather and the other of which is woven fabric, the top and bottom layers of rubber being united by integral connecting portions extending through holes in the reinforcing layers. Fig. 2 represents a section through the structure as indicated by line 2—2 of Fig. 1. Fig. 3 represents a view similar to Fig. 2, showing a reinforcing strip of leather the outer edge of which is serrated. The serrated formation in this modification accomplishes the same result as the connecting portions of rubber shown by Figs. 1 and 2. Fig. 4 represents a cross section through the welt strip shown by Fig. 3, the plane of the section being indicated by line 4—4 of Fig. 3. Fig. 5 represents a cross-sectional view of another modification, in which the reinforcing strip is leather and in which the top and bottom layers of rubber are interlocked with the leather by coacting dovetail formations. Fig. 6 represents a cross-sectional view of a portion of a shoe which includes a welt strip of the form shown by Fig. 1.

The same reference characters indicate the same parts wherever they occur.

Referring first to the form shown by Figs. 1 and 2, the main body of the welt strip consists of rubber. The top and bottom layers of rubber are indicated at 10 and 11 respectively, and the outer marginal portion is indicated at 12. A groove 13 is formed in the bottom layer to receive the usual inseam stitches 21 (see Fig. 6). In this form the rubber is reinforced by two contiguous layers 14 and 15 of woven fabric and leather respectively. These reinforcing layers are entirely inclosed by the rubber excepting as their outer edges may be exposed in consequence of trimming the marginal portion 12 of rubber. In order to hold the top and bottom layers of rubber against the reinforcing element when the marginal portion 12 is removed, I form the reinforcing layers with holes so that the rubber may form direct connection between the top and bottom layers 10 and 11 as indicated at 16. The connecting portions 16 may be located wherever desired, and there may be as many of them as necessary. The marginal portion 12 of rubber, along the toe and ball portions of the shoe, would not necessarily be entirely removed by the edge trimmer; but along the shank portion it would, in the majority of shoes, be entirely removed, so that the outer edges of the reinforcing layers would be exposed. The removal of the marginal portion 12 would not, however, leave the welt strip without adequate means to keep the top and bottom layers 10 and 11 of rubber firmly against the reinforcing element, because the connecting portions 16 of rubber prevent the top and bottom layers from pulling away from the reinforcing element. At the points where the union is due to vulcanization, such union is preserved by the connecting portions 16, and the several layers are thus held firmly against each other, notwithstanding exposure due to removal of the marginal portion 12.

In the form shown by Fig. 3 there is but one reinforcing layer, that being indicated at 15ª and being composed of leather. The outer edge of this reinforcing layer is serrated, the points 17 thereof being sufficiently close to the outer edge of the marginal portion 12 of rubber to take the outseam stitches 18 around the toe and ball portions of a shoe. Around the toe and ball portion of the shoe the outseam stitches would be set in from the outer edge of the welt strip about as far as the dotted line $x$—$x$, and some of the stitches would pass through the serrated portions of the reinforcing strip, while others might bridge across the serrated portions; but in either event the presence of the reinforcing material, even though not continuous, affords sufficient strength to relieve the rubber to a great extent of the stresses to which the stitches are subjected. Along the shank portion of the shoe the outseam stitches would be set back from the outer edge about as far as the dotted line $x'$—$x'$, and every stitch would pass through the reinforcing material. The edge trimmer in working along the toe and ball portions of the shoe would probably trim close to line $x^2$—$x^2$, without necessarily trimming the points 17 of leather, but along the shank portion where the outseam stitches would be at or near line $x'$—$x'$ the edge trimmer could work to line $x$—$x$. The latter line, it will be observed, is between the points and bases of the teeth, and when the welt strip has been trimmed to this line the outer marginal portions of what remains of the top and bottom layers of rubber would be connected by connecting portions of rubber each of which would be like that indicated at 19 in Fig. 3, relatively heavy lines representing the formations thus left.

In the form shown by Fig. 5 there is but one reinforcing strip, and that is composed of leather and is indicated at 15ᵇ. This strip, before being incorporated into the rubber, is channeled on its two broad faces to provide dovetail formations 20, 20. These dovetail formations cause the rubber and leather to be interlocked with each other independently of the sticking of the two materials caused by vulcanizing. The dovetail portions are set in from the outer edge of the welt strip, beyond the point to which the edge trimmer will work along the shank portions, so that the rubber and leather will remain interlocked throughout the entire length of the welt strip.

One characteristic feature of the invention which is common to all the forms shown is that the rubber and reinforcing material are interlocked with each other, although the interlocking portions in the form shown by Fig. 5 do not extend entirely through the reinforcing layer as they do in the forms shown by Figs. 1 to 4.

I claim:

1. A welt strip comprising a body of rubber and a reinforcing strip inclosed therein between the top and bottom portions of said rubber body, said body and reinforcing strip having interlocked portions arranged to keep said top and bottom portions against said reinforcing strip.

2. A welt strip comprising a body of rubber and reinforcing means inclosed therein between the top and bottom portions of said rubber body, said body and reinforcing means having interlocked portions arranged to keep said top and bottom portions against said reinforcing means.

3. A welt strip comprising a body of rubber and a reinforcing strip inclosed therein between the top and bottom portions of said rubber body, portions of said rubber body extending through said reinforcing strip and connecting said top and bottom portions to keep the latter against said reinforcing strip.

4. A welt strip comprising a body of rubber and a reinforcing strip inclosed therein between the top and bottom portions of said rubber body, portions of said rubber body being anchored in said reinforcing strip.

In testimony whereof I have affixed my signature, in presence of two witnesses.

OSCAR C. DAVIS.

Witnesses:
GEO. H. LEACH,
ERNEST W. STEDMAN.